United States Patent [19]
Maloberti et al.

[11] Patent Number: 5,155,396
[45] Date of Patent: Oct. 13, 1992

[54] INTEGRATED INTERFACE CIRCUIT FOR PROCESSING THE SIGNAL SUPPLIED BY A CAPACITIVE SENSOR

[75] Inventors: Franco Maloberti, Torre D'Isola; Gino Polito, Voghera; Franco Salerno, Alpignano, all of Italy

[73] Assignee: Marelli Autronica SpA, Milan, Italy

[21] Appl. No.: 592,169

[22] Filed: Oct. 3, 1990

[30] Foreign Application Priority Data
Oct. 3, 1989 [IT] Italy .................. 67847 A/89

[51] Int. Cl.$^5$ .................. H03K 5/00; H03K 5/08; H03B 1/00
[52] U.S. Cl. .................. 307/520; 307/543; 307/558; 307/550; 307/568; 328/167; 328/169
[58] Field of Search .......... 307/520, 521, 542, 543, 307/556, 565, 558, 566, 568; 333/19; 328/167, 169

[56] References Cited

U.S. PATENT DOCUMENTS

| | | | |
|---|---|---|---|
| 3,221,186 | 11/1965 | MacDonald et al. | 307/565 |
| 3,226,661 | 12/1965 | Garver et al. | 307/565 |
| 4,571,548 | 2/1986 | Jordan | 307/543 |
| 4,623,854 | 11/1986 | Kuraishi | 383/19 |
| 4,754,226 | 6/1988 | Lusigman et al. | 328/167 |

FOREIGN PATENT DOCUMENTS

0033721 2/1985 Japan .................. 307/565

*Primary Examiner*—Timothy P. Callahan
*Attorney, Agent, or Firm*—Sughrue, Mion, Zinn, Macpeak & Seas

[57] ABSTRACT

The circuit comprises an amplitude limiter made up with the use of two CMOS transistors and a circuit connected to the output of the amplitude limiter for filtering the signal and changing its level. The filtering and level-changing circuit is arranged, in particular, to achieve band-pass filtering in order to prevent aliasing effects which might arise during the sampling of the signal by subsequent switched-capacitance processing circuits, and to attenuate low-frequency components of the signal.

10 Claims, 3 Drawing Sheets

INTEGRATED INTERFACE CIRCUIT FOR PROCESSING THE SIGNAL SUPPLIED BY A CAPACITIVE SENSOR

BACKGROUND OF THE DISCLOSURE

The present invention relates to an interface circuit for use between a sensor with capacitive impedance, particularly a piezoelectric accelerometric sensor, and a circuit for processing the signal provided by the sensor, particularly a filtering circuit with switched capacitors.

Piezoelectric accelerometric sensors are used, for example, in systems for detecting pinking (knocking) in Otto-cycle internal combustion engines for motor vehicles. In this type of application, the signal provided by a piezoelectric accelerometric sensor is processed by processing circuits which include, in particular, integrated filtering circuits of the type with switched capacitors.

SUMMARY OF THE INVENTION

The object of the present invention is to provide an interface circuit of the aforesaid type which can optimise the characteristics of the signal coming from the sensor in view of the subsequent processing to which the signal will be subject.

According to the invention, this object is achieved by means of an interface circuit, characterised in that it comprises, integrated on a single substrate by CMOS technology, an amplitude-limiting circuit, including a first CMOS transistor whose source is intended to be connected to the output of the sensor and whose gate and drain are intended to be kept at a reference potential, and a second CMOS transistor whose gate and drain are connected to the source of the first transistor and whose source is intended to be kept at the reference potential; and a circuit for filtering the signal and changing its level, connected downstream of the amplitude-limiting circuit and comprising an inverting amplifier including an operational amplifier formed by CMOS technology and having its non-inverting input connected to a source of a direct-current reference voltage of lower value than the supply voltage, a first capacitive impedance circuit connected between the inverting input of the operational amplifier and the amplitude limiter, and a second capacitive impedance circuit connected between the inverting input and the output of the operational amplifier;

the capacitive impedance. circuits being such that, together, they have a band-pass filtering effect adapted to attentuate the low-frequency components of the sensor signal and to limit its band width.

A capacitive sensor of the aforesaid type typically has a reference terminal which, in use, is connected to earth or to a voltage supply, and a signal terminal at which the useful signal, which varies relative to the voltage applied to the reference terminal, is available in operation.

According to the invention, the transistors of the amplitude-limiting circuit are p-MOS devices produced by p-well CMOS technology or n-MOS devices produced by n-well CMOS technology, according to whether the reference terminal of the sensor is to be connected to earth or to a voltage supply, in use. This solution prevents any problems due to the leakage of stray currents associated with the known "latch-up" phenomenon into the substrate.

BRIEF DESCRIPTION OF THE DRAWINGS

Further characteristics and advantages of the invention will become clear from the detailed description which follows, with reference to the appended drawings, provided purely by way of non-limiting example, in which.

DETAILED DESCRIPTION OF THE INVENTION

Figure 1:
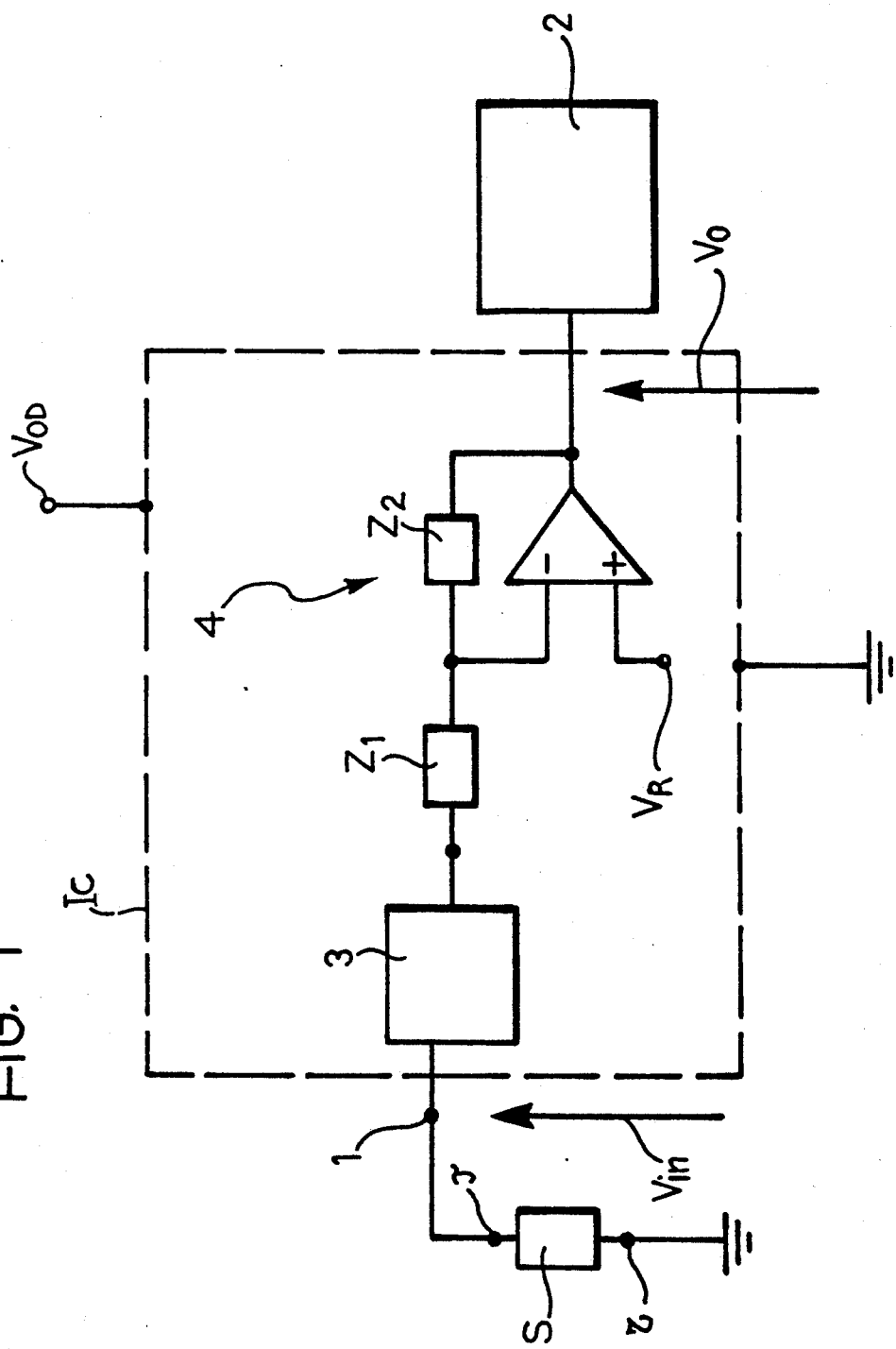
FIG. 1 shows an integrated device (shown in the form of a block diagram) for interfacing between a capacitive sensor and a switched-capacitance filtering circuit.

In FIG. 1, a capacitive-impedance sensor, for example a piezoelectric accelerometric sensor, is indicated S. The sensor has a reference terminal r and a signal terminal s. In the embodiment illustrated, the terminal r is connected to earth while the terminal s is connected to the input 1 of an interface circuit, generally indicated IC, interposed between the sensor and a circuit 2, such as a filtering circuit with switched capacitors, for the subsequent processing of the sensor signal. Since the terminal r of the sensor S is connected to earth, the useful signal available at the terminal s in use is a signal which varies relative to zero.

As already stated, the reference terminal r of the sensor S could, however, be connected to a potential other than earth, for example to a direct-current voltage supply, and in this case the useful signal would be a signal whose amplitude would vary relative to the level of that direct-current voltage.

The interface circuit IC, which is connected as a whole to a direct-current voltage supply $V_{DD}$ and to earth, as shown in the conceptual diagram of FIG. 1, comprises essentially an amplitude limiter 3 connected to a circuit, generally indicated 4, for filtering the signal and changing its level.

The amplitude limiter 3 limits the input signal and protects the interface circuit from excess voltage.

The circuit for filtering the signal and changing its level comprises an inverting amplifier including an operational amplifier A whose non-inverting input is connected to a direct-current reference voltage $V_R$ which is lower than the supply voltage $V_{DD}$ and equal, for example, to $V_{DD}/2$, a capacitive impedance circuit $Z_1$ connected between the inverting input of the operational amplifier A and the amplitude limiter 3, and a capacitive impedance circuit $Z_2$ connected between the inverting input and the output of the operational amplifier A.

Assuming that the amplitude limiter 3 operates in the linear region of its characteristic, the transfer function of the interface circuit IC, between its input and its output, is given by $$V_o/V_{in} = -Y1/Y2 = -H_{lp} \cdot H_{hp}$$

in which $V_{in}$ is the voltage input to the interface circuit, $V_o$ is the voltage output by the interface circuit,
$Y1$ is the admittance of the circuit $Z_1$.
$Y2$ is the admittance of the circuit $Z_2$,
$H_{lp}$ is a term representing a low-pass filtering function, and
$H_{hp}$ is a term representing a high-pass filtering function.

The circuit 4 as a whole thus changes the signal to a d.c. signal and has a low-pass filtering effect. This circuit is thus able both to limit the band width of the signal supplied by the sensor (which prevents aliasing effects in the subsequent sampling of the signal by switched-capacitance filters) and to have a low-pass filtering effect which attenuates the very low-frequency components of the signal which are of no interest.

The whole interface circuit IC can be produced in integrated form on a single substrate by CMOS technology, for example, in the manner which will now be described with reference to FIG. 2. In this drawing, parts and components already described above have again been given the same alphabetical and numerical symbols.

Figure 2:
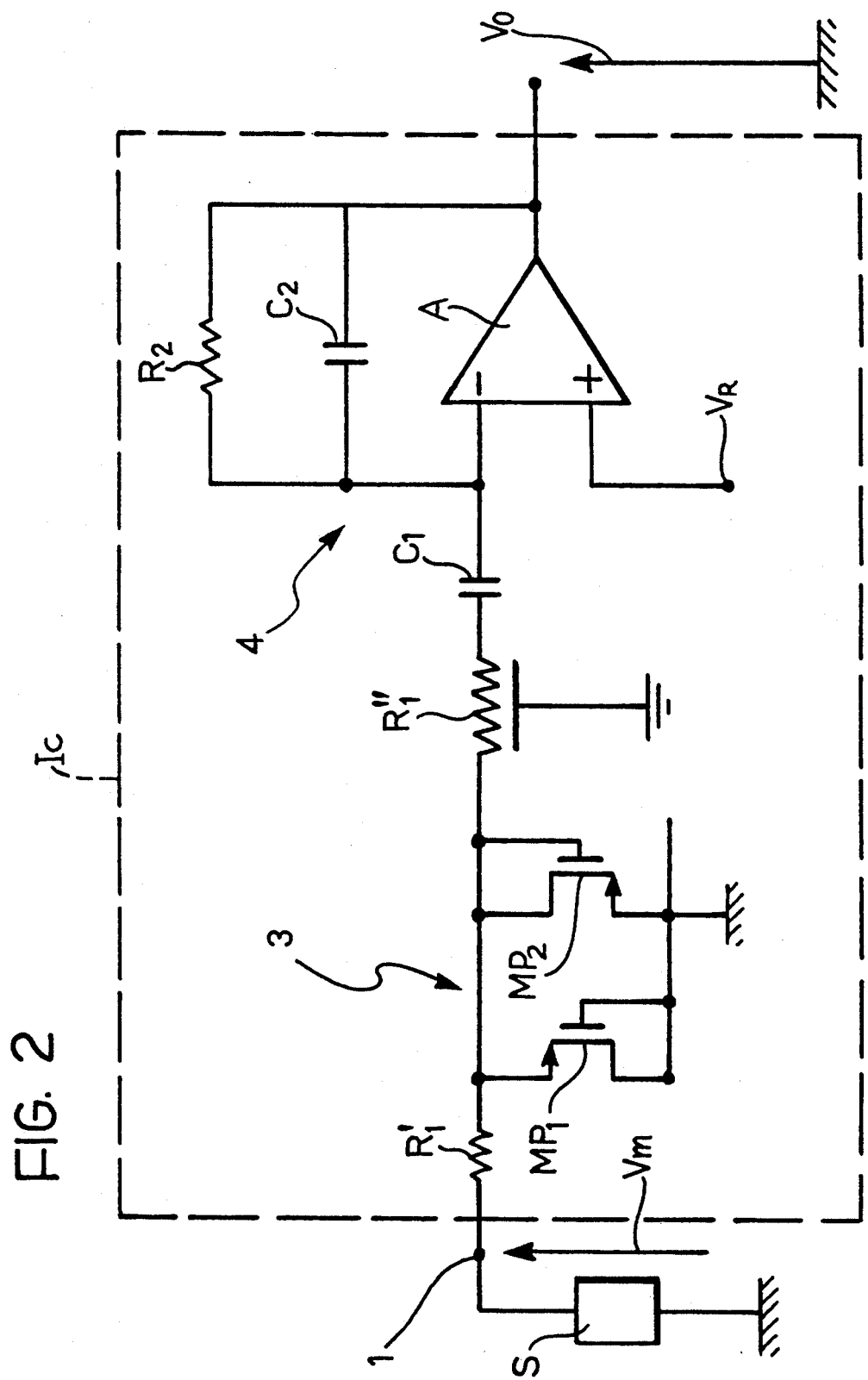
FIG. 2 is a more detailed circuit diagram of one embodiment of the interface circuit.

In the embodiment of FIG. 2, the amplitude limiter 3 comprises two transistors MP1 and MP2 produced by CMOS technology. The transistor MP1 has its source connected to the input terminal 1 through a resistor $R'_1$ and its gate and its drain connected to earth. The transistor MP2 has its gate and its drain connected to the source of MP1 and its source connected to earth.

The transistors MP1 and MP2, which are normally in the cutoff condition, limit the level of the input signal to $\pm V_t$ (the threshold voltage of the transistors). The level is limited when one of the two transistors starts to conduct, short-circuiting the input signal to earth. More particularly, the transistor MP1 limits positive amplitudes and protects the interface circuit from excessive voltages in the input signal whilst the transistor MP2 limits the negative amplitude of the signal.

The resistor $R'_1$ limits the current through the transistors MP1 and MP2 when the signal reaches levels close to the supply voltage.

If, as in the embodiment shown in the drawings, the sensor S has its reference terminal connected to earth, the transistors MP1 and MP2 are p-MOS transistors produced by p-well CMOS technology. If, however, the reference terminal r of the sensor S is connected to a direct-current supply, the transistors are n-MOS devices produced by n-well CMOS technology. In this case, the gate and the drain of MP1 and the source of MP2 are connected to $V_{DD}$ instead of to earth.

As stated above, these solutions prevent the problems which may result from the leakage of stray currents into the substrate.

The use of p-MOS or n-MOS transistors is more advantageous than the use of ordinary diodes with MOS-technology junctions since they permit a more dynamic input signal and prevent any current leakage caused by the stray bipolar transistors.

The filtering and level-changing circuit in the diagram of FIG. 2 has a transfer function which corresponds to a band-pass filtering effect between its input and its output. For this purpose, a resistor $R''_1$ and a capacitor $C_1$ are interposed in series between the amplitude-limiting circuit 3 and the inverting input of the operational amplifier A. Moreover, a resistor $R_2$ and a capacitor $C_2$ are connected in parallel between the inverting input and the output of A.

The transfer function achieved thus assumes the following expression:

$$V_o/V_{in} = -H_{lp} \cdot H_{hp} = \frac{-1}{(1 + sC_1R_1)} \cdot \frac{sC_1R_2}{(1 + sC_2R_2)}$$

in which $R_1 = R'_1 + R''_1$.

In particular, this transfer function has two poles which determine its low-pass and high-pass behaviour respectively at the frequencies $$f_{lp} = \frac{1}{2\pi C_1 R_1} \quad f_{hp} = \frac{1}{2\pi C_2 R_2} < f_{lp}$$

The pole at frequency $f_{lp}$ is intended to limit the band width of the signal and may, for example, be at a frequency of approximately 60 kHz. The formation of $R_1$ and $C_1$ by CMOS technology in order to ensure such a value of $f_{lp}$ does not pose particular problems. In fact a pole at 60 kHz can easily be achieved, for example, with a 20 pf capacitor and a 132 kohm resistor, which values can be integrated on a silicon substrate of quite large, but nevertheless acceptable area.

Problems may arise, however, in the formation of the pole at the frequency $f_{hp}$, particularly when this frequency has to be quite low. If, for example, this frequency must assume a value of about 600 Hz and if $C_2$ has a value of 20 pF, a resistor with a resistance $R_2$ of about 13 Mohms is required and this is an unacceptable value for production in an integrated circuit.

Figure 3:
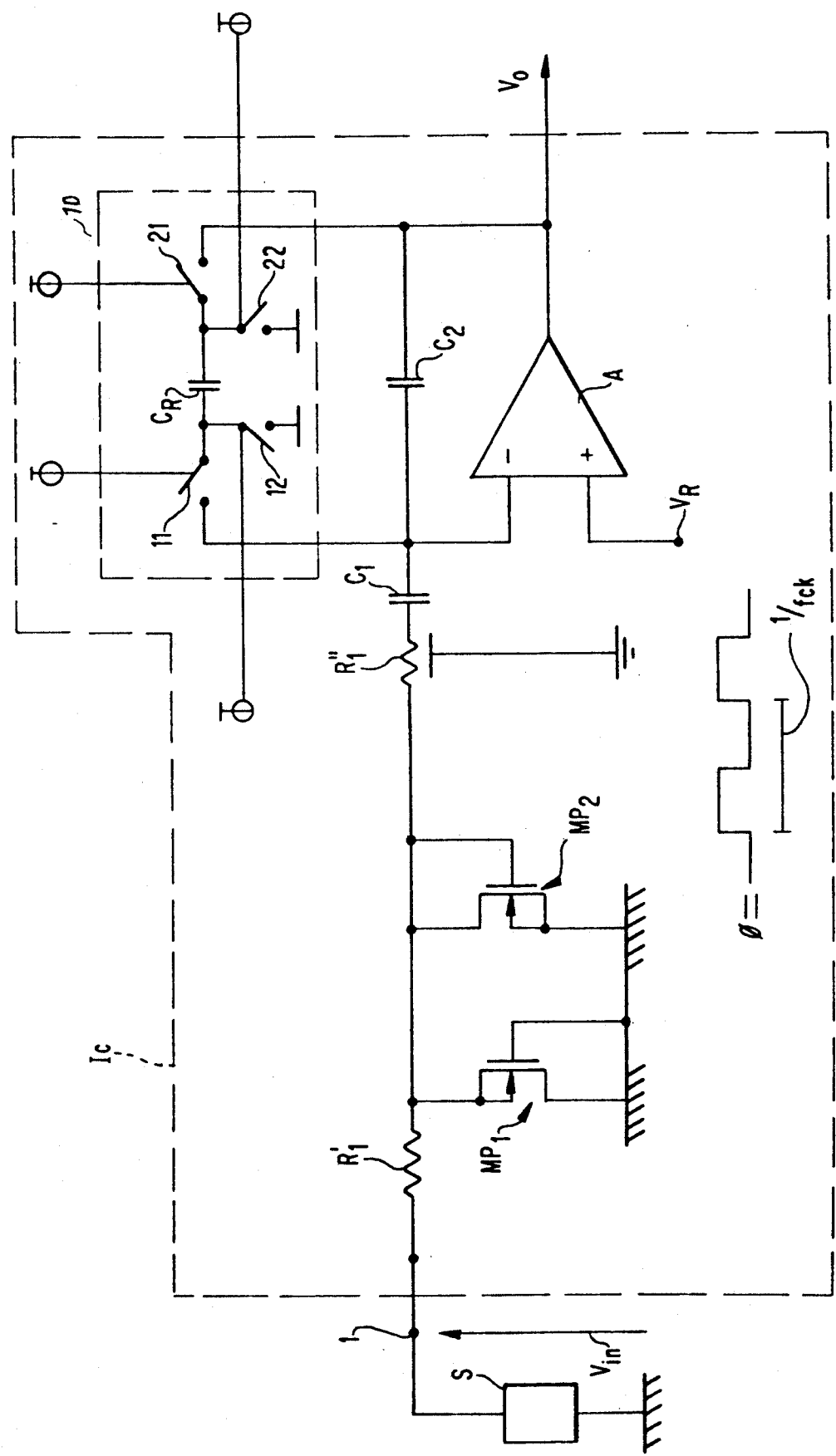
FIG. 3 shows a further embodiment of the circuit according to the invention.

In such cases, the solution shown in FIG. 3 may be adopted. In the arrangement shown in this drawing, a switched-capacitance circuit, generally indicated 10, is provided in parallel with the capacitor $C_2$. This circuit comprises a capacitor $C_R$ whose plates are connected to those of $C_2$ through two switching circuits comprising respective first switches 11 and 21, connected between the plates of $C_R$ and the homologous plates of $C_2$, and respective second switches 12 and 22, connected between the plates of $C_R$ and earth.

In use, the switches 11 and 21 are operatively connected so as to switch on and off in phase with each other by means of a clock signal $\phi$ of frequency $f_{ck}$.

The switches 12 and 22, however, are also operatively connected to switch on and off in phase with each other, but in counterphase with the switches 11 and 21 ($\overline{\phi}$).

The switched capacitor circuit 10 as a whole simulates a resistor with a resistance equivalent to $$R_{eq} = \frac{1}{f_{ck} \cdot C_R}$$

where $f_{ck}$ is the clock frequency used.

Thus if $f_{ck}$ is 150 kHz, $C_2$ is 20 pF and $C_R$ is 0.5 pF, a pole is obtained at the frequency $$f = \frac{1}{2\pi} \cdot f_{ck} \cdot \frac{C_R}{C_2} = \frac{150 \text{ kHz}}{6.28} \cdot 40 = 600 \text{ Hz}$$

It is important to stress that the solution in FIG. 3 is compatible with the need to limit the band width of the signal in order to prevent aliasing of the sampled signal. In fact, the operational amplifier A, which operates by sampling in discrete time domains, "sees", as its input, the signal current which in effect is filtered continuously by the resistance $R_1 = R'_1 + R''_1$ and by the capacitor $C_1$.

Finally, the resistor $R''_1$ can be formed in a distributed manner so as to increase the equivalent attenuation at high frequencies.

The interface circuit described above can be integrated by CMOS technology on a single substrate on which circuits for the subsequent processing of the signal can also be integrated conveniently.

We claim:

1. An interface circuit for interfacing between a capacitive sensor and a filtering circuit for processing a signal supplied by the sensor, the interface circuit comprising:
    an amplitude-limiting circuit comprising a first transistor whose source is connected to an output of the sensor and whose gate and drain are kept at a reference potential, and a second transistor whose gate and drain are connected to the source of the first transistor and whose source is kept at the reference potential; and
    a circuit for filtering and changing a level of an output signal of the amplitude-limiting circuit, and comprising an inverting amplifier including
    an operational amplifier having its non-inverting input connected to a source of a direct-current reference voltage of a value lower than a supply voltage,
    a first capacitive impedance circuit connected between an inverting input of the operational amplifier and the amplitude-limiting circuit, and
    a second capacitive impedance circuit connected between the inverting input and an output of the operational amplifier,
    wherein the first and second capacitive impedance circuits collectively provide a bandpass filtering effect, adapted to attenuate low-frequency components of the signal of the sensor and to limit its bandwidth.

2. A circuit according to claim 1, wherein the sensor has a reference terminal which is connected to a voltage corresponding to one of earth or a supply voltage, and a signal terminal which varies relative to the voltage applied to the reference terminal, and wherein the first and second transistors are p-MOS devices produced by p-well CMOS technology, or n-MOS devices produced by n-well CMOS technology, according to whether the reference terminal of the sensor is connected to earth or to the supply voltage.

3. A circuit according to claim 1, wherein the first capacitive impedance circuit is of the series-RC type.

4. A circuit according to claim 3, wherein the second capacitive impedance circuit is of the parallel-RC type.

5. A circuit according to claim 4, wherein the second capacitive impedance circuit comprises:
    a first capacitor connected between the non-inverting input and the output of the operational amplifier, and
    a switched-capacitor circuit comprising a second capacitor whose plates are connected to the inverting input and the output of the operational amplifier by means of first and second switching circuits respectively, each of which comprises first switches connected between a plate of the second capacitor and the operational amplifier and second switches connected between the same plate of the second capacitor and earth;
    wherein the first switches of the two switching circuits being operatively connected to switch on and off in phase with each other and in response to a first clock signal of predetermined frequency; and the second switches of the switching circuits being operatively connected to switch on and off in phase with each other in response to a second clock signal which is in counterphase with the first clock signal.

6. A circuit according to claim 5, wherein the first capacitive impedance circuit comprises a resistor which is formed in a distributed manner.

7. A circuit according to claim 1, wherein said capacitive sensor is piezoelectric accelerometric sensor.

8. A circuit according to claim 1, wherein said filtering circuit is a switched-capacitive filtering circuit.

9. A circuit according to claim 1, wherein said interface circuit is integrated on a single substrate by CMOS technology.

10. A circuit according to claim 1, wherein said first and second transistors are formed by CMOS technology.

* * * * *